US007011111B2

(12) United States Patent
Spiegl et al.

(10) Patent No.: US 7,011,111 B2
(45) Date of Patent: *Mar. 14, 2006

(54) SEALING ELEMENTS FOR COMPRESSOR VALVES

(75) Inventors: Bernhard Spiegl, Vienna (AT); Dietmar Artner, Oberwart (AT)

(73) Assignee: Hoerbiger Kompressortechnik Services GmbH, Vienna (AT)

( * ) Notice: Subject to any disclaimer, the term of this patent is extended or adjusted under 35 U.S.C. 154(b) by 42 days.

This patent is subject to a terminal disclaimer.

(21) Appl. No.: 10/288,468

(22) Filed: Nov. 6, 2002

(65) Prior Publication Data

US 2003/0085533 A1 May 8, 2003

(30) Foreign Application Priority Data

Nov. 7, 2001 (AT) ................................ 1754/2001

(51) Int. Cl.
*F16K 15/14* (2006.01)

(52) U.S. Cl. ...................... 137/855; 137/856; 251/358; 417/566

(58) Field of Classification Search ................ 137/855, 137/856, 857, 858; 251/358, 368; 417/566, 417/571, DIG. 1
See application file for complete search history.

(56) References Cited

U.S. PATENT DOCUMENTS 3,536,094 A 10/1970 Manley, Jr.
3,994,319 A * 11/1976 Airhart ....................... 137/855
4,643,139 A * 2/1987 Hargreaves ............... 123/65 V
4,786,031 A * 11/1988 Waldrop ..................... 251/368
5,112,901 A 5/1992 Buchert et al.
5,192,200 A * 3/1993 Lilie et al. .................. 417/566
5,521,000 A * 5/1996 Owens ....................... 442/218
6,357,755 B1 3/2002 Feistel

FOREIGN PATENT DOCUMENTS

| | | |
|---|---|---|
| CA | 1155034 | 10/1983 |
| DE | 3145147 | 9/1982 |
| DE | 3809837 | 10/1988 |
| EP | 0 626 905 B1 * | 9/1993 |
| EP | 0933566 | 8/1999 |
| EP | 1221554 | 7/2002 |
| GB | 1025713 | 4/1966 |
| JP | 8-226556 * | 3/1996 |

* cited by examiner

*Primary Examiner*—Ramesh Krishnamurthy
(74) *Attorney, Agent, or Firm*—Dykema Gossett PLLC

(57) ABSTRACT

In sealing elements (3, 3', 3") for automatic compressor valves, composed of synthetic material (12) having embedded fiber reinforcement (11), the fiber reinforcement (11) and/or the surrounding synthetic material (12) in the finished sealing element (3, 3', 3") has an inhomogeneous distribution and/or locally different material characteristics under consideration of different local requirements. Near-surface regions (14) may be designed to be free of fiber to avoid fiber breaks and the danger of cracks extending from there, and said near-surface regions (14) may preferably consist of different materials compared to the one in the remaining sealing element (3, 3', 3")

11 Claims, 4 Drawing Sheets

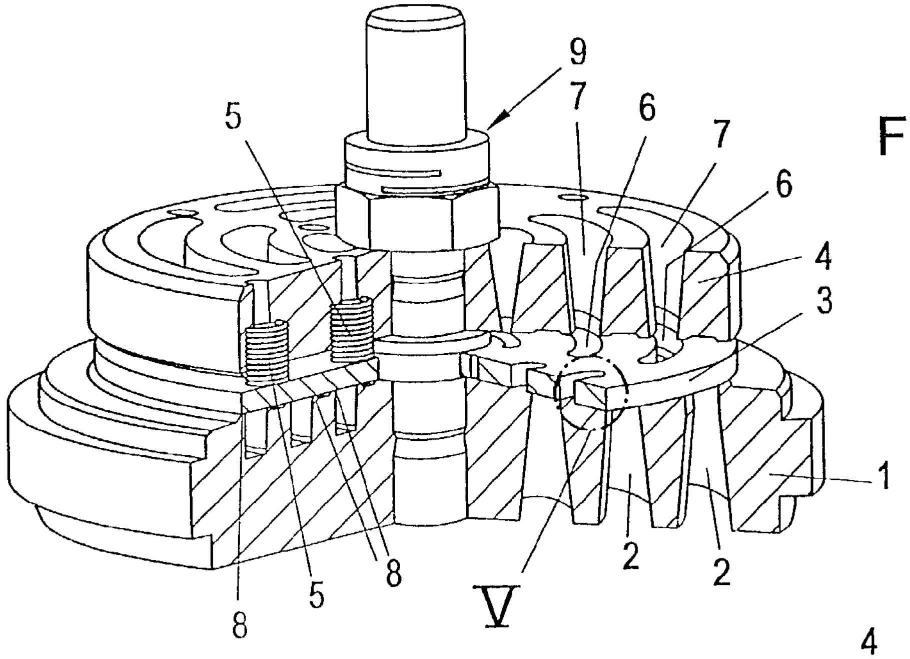
FIG. 1
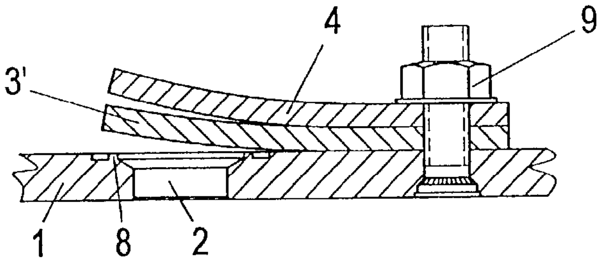
FIG. 2
FIG. 3
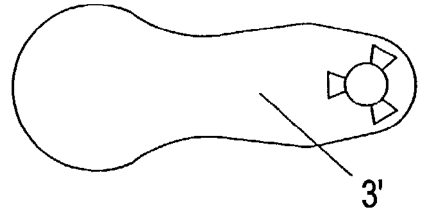
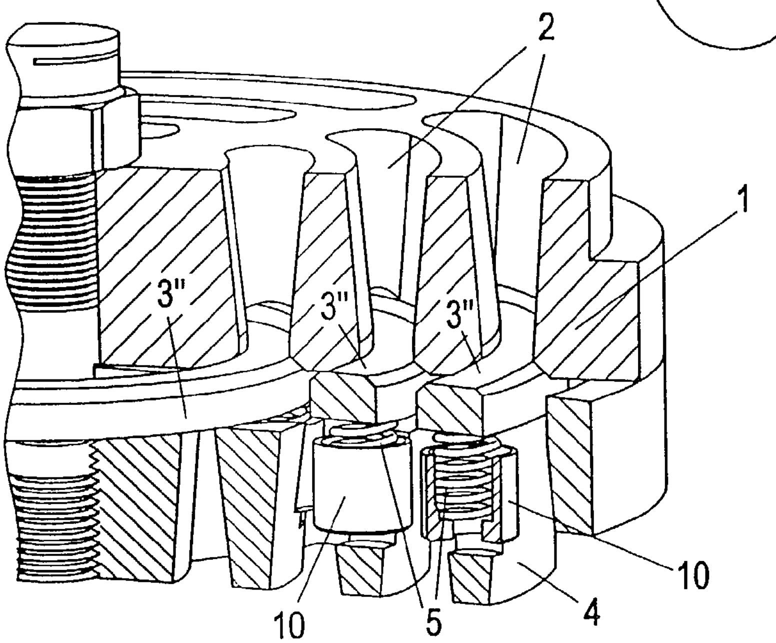
FIG.4

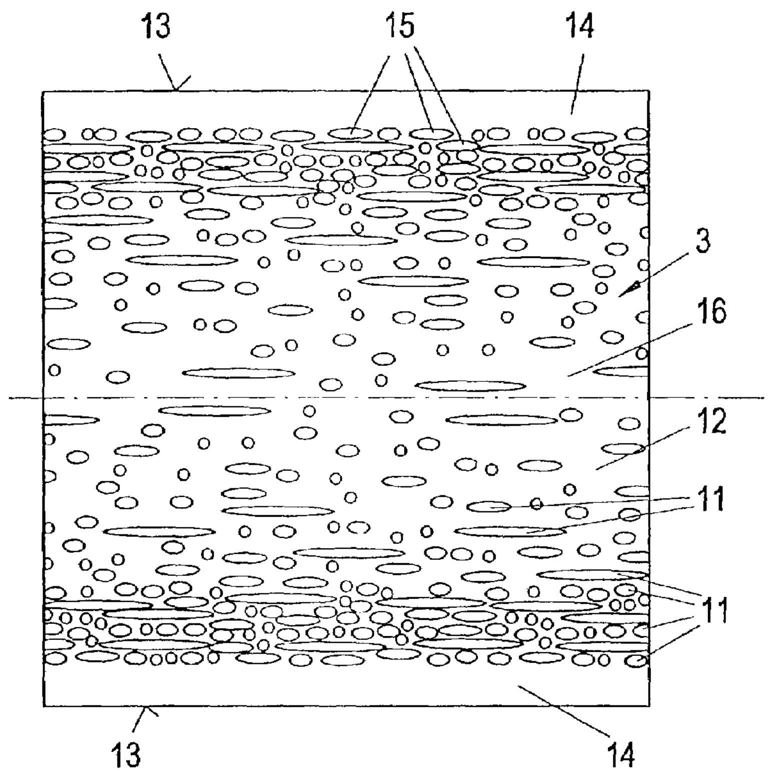
FIG. 5
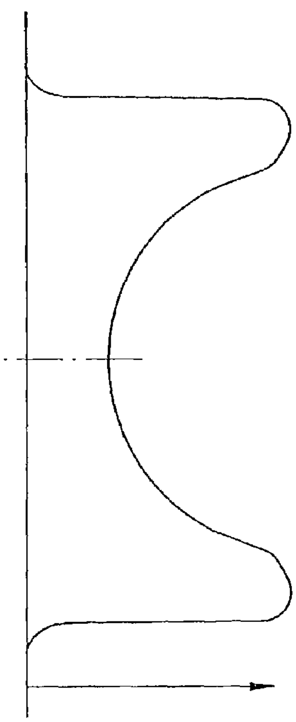
FIG. 6
FIG.7
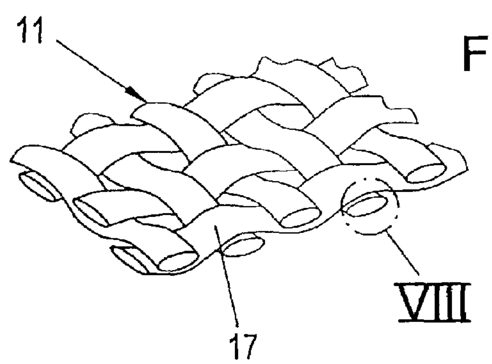
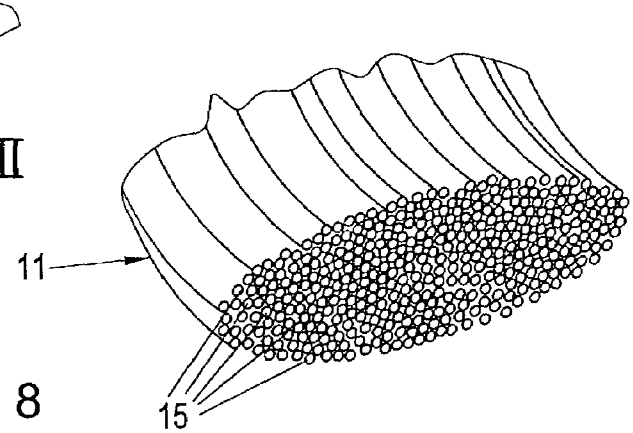
FIG. 8

FIG. 9
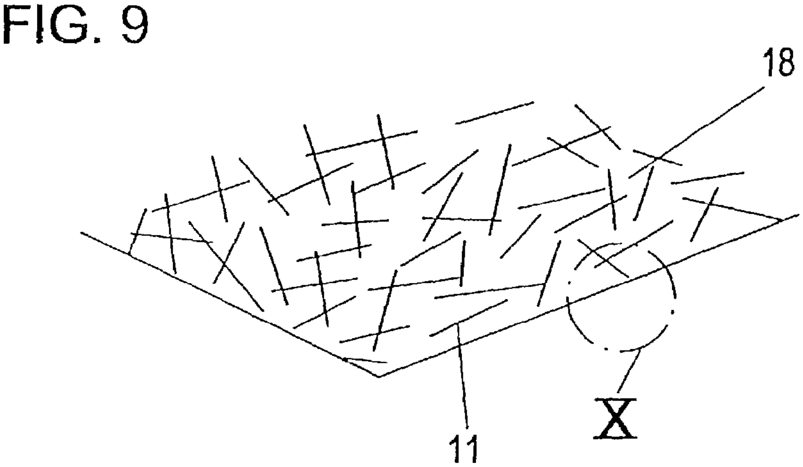
FIG. 10
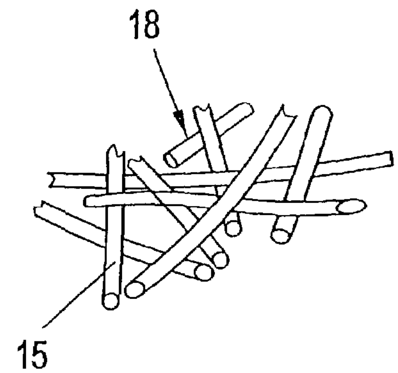
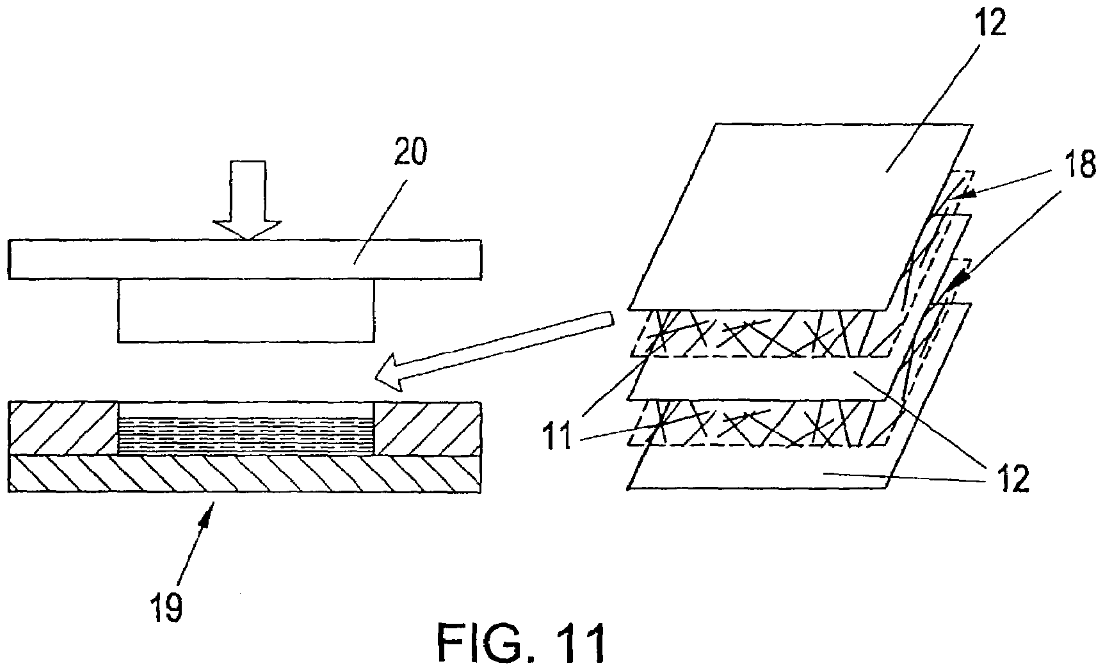
FIG. 11

SEALING ELEMENTS FOR COMPRESSOR VALVES

BACKGROUND OF THE INVENTION

1. Field of the Invention

The invention relates to sealing elements, particularly sealing plates, sealing rings, and sealing lamellas for automatic compressor valves composed of synthetic material with embedded fiber reinforcement.

2. The Prior Art

Sealing elements of this type have been used for years as parts for closing devices of highly dynamically stressed automatic compressor valves. See in this respect, for example, EP 40 930 A1, EP 933 566 A1 or U.S. Pat. No. 3,536,094. In case of short-fibered reinforcements (having a fiber length typically in the range from 0.1 to 0.3 mm), synthetic materials are processed in an injection molding method, which provides an homogeneous structure throughout the depth of the component as well as in radial or longitudinal direction except for the sometimes minor form-conditional or fabrication-conditional inhomogeneous regions. This is similar also in long-fibered reinforced synthetic materials having fiber reinforcements in the form of embedded woven fabrics or individual fiber bundles (rovings), which show a relatively homogeneous structure as well.

Even though fiber-reinforced synthetic materials have principally wellknown, highly suitable characteristics, which are basically for sealing elements of this type, there have occurred problems with of sealing elements of prior art by having an insufficient durability. Especially in case of highly dynamic stresses in high-speed compressors, there occur oftentimes damage and breaks after a relatively short period, which has prevented, up to now, the wide employment of this promising material.

It is the object of the present invention to avoid the above-mentioned disadvantages of the known sealing elements of the aforementioned type and to design specifically such sealing elements in a manner whereby higher durability can be achieved through simple means.

SUMMARY OF THE INVENTION

For the solution of the stated problems, the present invention considered the findings of defective (torn, broken, etc) sealing elements of the prior art, which surfaced during the evaluation of tests. The material stress and the thereby connected demands on the material depend highly on the respective local position in the component itself. For example: stress through impact on the surface of the sealing element (e.g., during the striking of the sealing plate onto the valve seat or during the impact of the sealing lamella at the end of a port) places completely different demands on the utilized material than mere bending (even highly dynamic bending). Fibers on or just underneath the surface of such impact-stressed elements become broken at some time by the recurring impact and there might also develop an expansion of the crack into the surrounding material, starting at the location of the crack, or it might cause excessive wear at the valve seats themselves. Similar considerations point to the fact, for example, that fibers in the core of the sealing element barely contribute to the flexural strength and they highly reduce the desired damping behavior.

Based on these and various other considerations in this vein, there is now given the inventive solution to the stated object whereby the fiber reinforcement and/or the surrounding synthetic material in the finished sealing element has an inhomogeneous distribution and/or has locally different material characteristics under the consideration of different local requirements. This means therefore that the composite of synthetic material and fiber reinforcement is optimally and very appropriately defined according to the demands or the consideration thereof, and it is very discretely adjusted to the respective locally existing requirements. This composite system can thereby be adjusted at specific locations and call for tougher material in view of impulse-type blows or in view of the prevention of damages caused by such blows. This can be achieved, for example, in that there are provided less rigid fiber reinforcements but correspondingly tougher synthetic materials (or both). The same is true for the regions in which rigidity is not required, which in turn would reduce damping characteristics. A corresponding material combination or local arrangement can thereby also lead to a consideration for significant improvements of the sealing element as a whole.

In an especially preferred embodiment of the invention, the near-surface region of the finished sealing element, which faces the seat surface and/or the surface of the stop element, is free of fiber reinforcement, preferably up to a depth that is at least two-times or three-times the size of the fiber diameter. Thus, there can be prevented, on one hand, the above-mentioned near-surface fiber breaks including cracks starting from there under certain circumstances and, on the other hand, impacting blows can be better damped or distributed by these layers having no reinforcement.

In an additional preferred embodiment of the invention, the fiber-free regions near the surface consist of different material compared to the rest of the sealing element, preferably having a better toughness and/or high damping characteristics and/or higher resistance against cracking caused by fatigue, which provides additional advantages in view of stability of the sealing element.

Since traditional mechanical fabrication of the shaped and finished sealing element can be difficult under circumstances by cutting it from a semi-finished plate having a fiber-free top layer, especially with its design of being made with materials of great toughness, cutting with a water jet (water torch) under high pressure has been shown to be especially advantageous, particularly in this application.

It must be stated in conjunction with the above context that the top layer is oftentimes fiber-free in all aforementioned sealing elements because of the fact that in fabrication by injection-molding using short-fibered reinforced synthetic materials and in manufacturing by means of continuous or intermittent compression molding using long-fibered synthetic materials, the fibers that are close against the mold experience a backflow of synthetic material between and up to the actual line of contact. However, these “fiber-free” top layers are mostly very thin (in a range of a few thousandths of a millimeter) and they are removed most of the time during the finishing process of the sealing element. In contrast, the fiber-free near-surface regions of the present invention are considerably thicker (typically approximately 0.05 to 0.2 mm) and they are intentionally not removed during the finishing process. Furthermore, it is known in the so-called two-part (two-component) injection-molding process in conjunction with various fiber-free and rather low-stressed components made of synthetic material, to use high-grade material only in the outer surface area of the finished product, which is practically filled with low-grade material from the inside before hardening, and which in turn results in being of a different material in the near-surface regions. However, with these known manufacturing methods, there is no primary desire for adjustment of local characteristics of a high-stressed component to the respective locally existing stresses, but there is only the effort made to achieve low costs through coating of a relatively low-grade core material with a higher-grade surface material.

According to a further preferred embodiment of the invention, an intermediate layer, which is disposed between the seat surface and the surface of the stop element, is provided with less fiber reinforcement relative to the neighboring layers, preferably a decreased proportion of fiber volume compared to the neighboring regions. Thereby it can be taken into consideration that these center layers—as mentioned above—contribute considerably less to the required rigidity of the sealing element that the near-surface layers disposed at both sides thereof, whereby, however, the desired damping of the entire element is negatively influenced by the reinforcement material used rather senseless in the center layer. Through this performed adjustment, there is now provided a so-called "gradient material" whereby often-changing proportions of fiber volumes could be realized throughout the depth of the sealing plate, for example.

In an additional embodiment of the invention, the fiber reinforcement if provided with at least one piece of an essentially flat non-woven fiber fabric, which has at least in it plane a directionally independent (random) fiber orientation and/or at least one piece of an essentially flat woven fiber fabric or fiber web. Aside from the possibility to simply provide flat fiber reinforcements of the same type, disposed different relative distances apart, and distributed throughout the depth of the sealing element, the advantages of relatively dense, flat woven fabrics or webs made of long fibers (a great number of reinforcement fibers packed in a thin layer having a relatively high rigidity effect) can be combined with the advantages of a relatively loose, non-woven fiber fabric (a practically uniformly distributed orientation of not-so-tightly packed long fibers results in improved damping at sufficient rigidity). Of course, fiber reinforcements may naturally be inserted there separately or in addition in the form of individual bundles or strands of long fibers since this is necessary for consideration of locally diverse requirements.

In the scope of the invention, "gradient material" of this type may be realized with short-fibered reinforced synthetic materials, e.g., fabricated by the injection-molding process, or with long-fibered reinforced synthetic materials as well. Fabrication may be performed in the latter case by continuous compression molding in a double-belt press, for example, or by intermittent compression molding in individual compression molds. In case of thermoplastic molds, the molten mass or powder is applied to the pieces of woven fabric or fiber reinforcement and subsequently both parts are pressed together by compression molding—or corresponding plastic sheets of a thickness in the range of 0.02 mm to 2 mm are layered together with the woven fabric or fiber reinforcement and pressed together under pressure at high temperatures. In duroplastic resin systems, resin may be applied to the flat reinforcement fabric and then hardened under high temperature and pressure.

In a preferred embodiment of the invention, the inhomogeneous distribution is dependent on the size and/or shape and/or the material and/or the spatial arrangement or distribution of one or more pieces of fiber composites. This makes a consideration possible, in the simplest way, of locally different demands for stability, rigidity, damping etc. of the finished sealing element.

According to an especially preferred embodiment of the invention, the length of the individual fibers in the flat fiber composite is at least greater than 2 mm for the most part, preferably at least greater than 4 mm for the most part—in contrast to the short-fibered reinforced synthetic materials with fiber lengths in the range of tenth of millimeters—which makes a sufficient reinforcement effect possible at relatively small proportions of fibers and makes thereby also possible a damping behavior that remains sufficiently high.

The average proportion of fiber volume lies in the finished sealing element in the range of 5 to 30 percent, preferably in the range of 10 percent to 20 percent, which—as already mentioned above—does not restrict the advantageous damping of highly dynamic stresses for the sealing element of this type, which take effect inside the sealing element itself at sufficient rigidity.

In a further preferred embodiment of the invention, the fiber reinforcement consists glass fibers, aramide fibers, steel fibers, ceramic fibers, carbon fibers, or a mixture thereof, but preferably of carbon fiber—and the surrounding synthetic material consists of duroplastic or thermoplastic synthetic material, particularly epoxy resin, bis-maleimide resin, polyurethane resin, silicone resin, PEEK, PA, PPA, PTFE, PFA, PPS, PBT, PET, PI or PAI, preferably PEEK, PA, PFA or PPS.

All these materials or the thereby combinations of material have shown to be highly suitable for the purposes of the invention and they also provide sufficient damping characteristics, toughness, fatigue resistance, and the like, at sufficient stability and rigidity of the sealing elements.

In the following, the invention is described in more detail with the aid of partially schematic drawings.

BRIEF DESCRIPTION OF THE DRAWINGS

FIG. 1 shows thereby a perspective view of a partial cutaway view of the compressor valve having a sealing plate designed according to the invention;

FIG. 2 shows a partial cross section through a lamellar valve used as a pressure valve of a compressor (not further illustrated) having a sealing lamella designed according to the invention;

FIG. 3 shows a top view onto the sealing lamella according to FIG. 2;

FIG. 4 shows a perspective view of a partial cutaway view of a compressor valve having individual sealing rings according to the present invention;

FIG. 5 shows a magnification of the cross section V in FIG. 1;

FIG. 6 shows a diagram symbolizing the local or layer-wise varying fiber reinforcement in a cross section according to FIG. 5;

FIG. 7 shows a schematic illustration of a section of a woven fabric for use as fiber reinforcement in a sealing element according to FIGS. 1–4, for example;

FIG. 8 shows the enlarged detail VIII from FIG. 7;

FIG. 9 shows a schematic illustration of a section of a non-woven fiber fabric for use as fiber reinforcement in a sealing element according to FIGS. 1–4, for example;

FIG. 10 shows an enlarged detail X from FIG. 9;

FIG. 11 shows a schematic fabrication device for intermittent compression molding having a single compression mold to manufacture a semi-finished plate for a sealing element according to the invention.

DETAILED DESCRIPTION OF THE PREFERRED EMBODIMENTS

Figure 12:
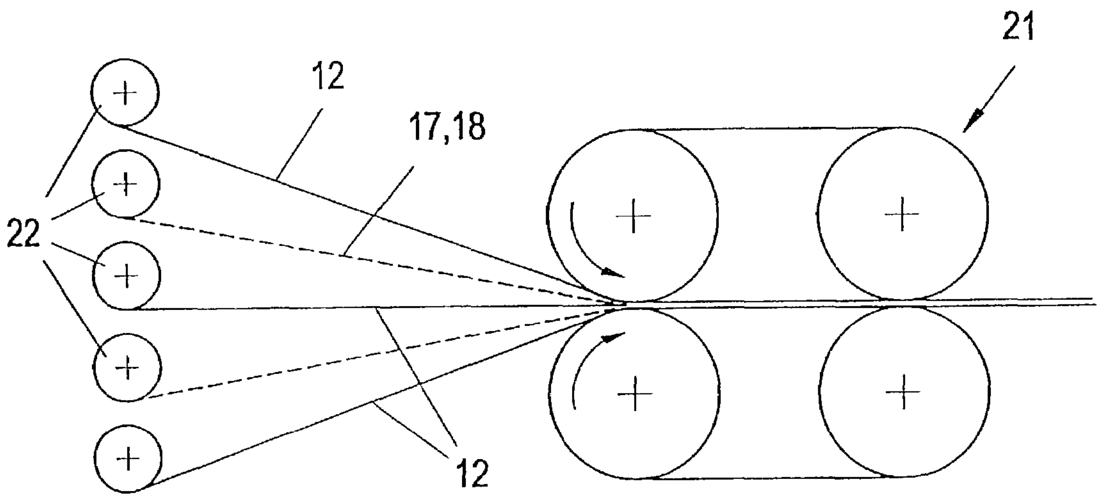
FIGS. 12 and 13 show, for example, fabrication devices to manufacture semi-finished strips for sealing elements of the invention by continuous compression molding in double-belt presses.

The automatic compressor valve in FIG. 1 consists essentially of a valve seat 1 whose essentially annular, concentrically arranged passage ports 2 are covered by a sealing plate 3, which is urged in the directed of the valve seat 1 from the stop element 4 by means of a coil spring 5. A center bolt 9 holds the components together; the surrounding area for installation is not illustrated. After surpassing a pressure difference, which may be determined by the spring 5, the sealing plate 3 opens the passage port 2 by lifting from the valve seat 1 whereby the pressure medium can now flow through the concentric slots 6 in the sealing plate 3 and the corresponding exhaust ports 7 in the stop element 4.

Lifting of the seal plate 3 from the valve seat 1 or the seal shoulders 8 formed thereon—stopping at the stop element 4 at the opposite side, after surpassing the reciprocation gap predetermined by the design of the valve—and recurring stopping of the sealing plate 3 at the valve seat 1 or the seal shoulders 8 at the end phase of the valve opening—all this occurs automatically depending on the stroke movement of the compressor piston (not illustrated) and the thereby corresponding dynamic to highly dynamic medium flow. This medium flow determines in turn the dynamic stress on the sealing plate 3, for which there are special requirements in its construction and selection of material in view of a sufficiently high durability of all participating components.

The valve seat 1 in the lamellar valve of FIG. 2 is provided with only one circular passage port 2 whose sealing shoulder 8 cooperates with a sealing lamella 3', which extends essentially in longitudinal direction, and which held to the valve seat 1 and the stopping element 4 by means of a bolt 9 whereby the stopping element 4 also extends in longitudinal direction. The sealing lamella 3' is here not separately biased by a spring and it tightly rests against the valve seat in the closed condition of the valve by being possibly pre-stressed internally. In FIG. 2 there is illustrated the sealing lamella 3' in an already raised intermediate position before it comes to rest completely against the stop element 4 at the end of its possible lifting motion. Apart from the illustrated design of having a single passage port 2 assigned to the sealing lamella 3, there could also be covered or controlled a plurality of neighboring passage ports of this type by one common sealing lamella 3'. Dynamic movement and stress develops here also on the sealing lamella 3', especially at its free end facing the passage port 2, which is caused by the dynamic to highly dynamic reciprocating movement of the compressor piston (not further illustrated). In addition, there also develops a dynamic bending stress in the region between the bolt 9 and the free end of the sealing lamella 3', which results in a total stress for the sealing element that deviates somewhat from the one in FIG. 1.

The compressor valve in FIG. 4 is in some way again similar to the one in FIG. 1 whereby a valve seat 1 is provided with concentric passage ports 2 and whereby a corresponding stop element 4 are also held together by means of a center bolt 9. In place of the one-piece sealing plate 3, there are provided individual concentric sealing rings 3", which are separately biased by means of springs 5 arranged in sleeves 10 and extending from the stop element 4 whereby said sealing rings 3" may move independently from one another between the valve seat 1 and the stop element 4. The movement and stress on the sealing rings 3" occurs dynamically and they are again dependent on the periodic movement of the piston in the compressor (not further illustrated) or the pressure cycles caused thereby, which again results in stress characteristics, based on the individual sealing rings 3", and which also deviates from the situation in the valve according to FIG. 1.

All application examples of the inventive sealing element illustrated in FIGS. 1–4 have as a common feature the dynamic to highly dynamic stress caused by surface impact while sealing shoulders or stop elements are being struck, which leads in all cases to similar advantageous solutions for problems to be considered in view of the structural design and selection of materials for major sealing elements made of synthetic material with embedded fiber reinforcement.

According to the invention, the fiber reinforcement 11 in FIGS. 5–13 and/or the surrounding synthetic material in the finished sealing element 3, 3', 3" is provided with an inhomogeneous distribution and/or locally different material characteristics under consideration of different local requirements. Thus, the composite of synthetic material and the fiber reinforcement can be specifically defined and adjusted optimally and in an accurate manner to the respective locally existing requirements. According to FIG. 5, it may be proposed, for example, that the near-surface region 14 of the finished sealing element 3, which faces the seat surface and the surface of the stop element 13, is free of fiber reinforcement 11 preferably up to a depth that is at least two-times or three-times the size of the diameter of the individual fiber 15. Near-surface fiber breaks and cracks starting from there under circumstances can be prevented, on one hand, as they can occur through the highly dynamic stress at impact of the sealing element 3 onto the seal shoulders 8 and, on the other hand, the impacting blows can be better damped or the developing stress can be distributed over the cross section of the sealing element 3. These fiber-free, near-surface regions 14 may be composed of different materials having greater toughness or damping behavior compared to the synthetic material used in the remaining part of the sealing element 3, which offers additional advantages.

It can be seen also in FIG. 5 and FIG. 6 that a center layer 16, disposed between the seat surface and the surface of the stop element 13, is provided with less fiber reinforcement relative to the neighboring layers, which is realized here by a decreased proportion of fiber volume compared to the one in the neighboring regions. Taken into consideration is thereby that this center layer 16 contributes considerably less to the required rigidity of the sealing element 3 than the near-surface layers disposed at both sides thereof, whereby, however, the desired damping quality of the entire element would be negatively influenced by the reinforced material used rather senselessly in the center layer 16.

A "gradient material" is created by the design and arrangement of the reinforcement 11 in FIG. 5 and FIG. 5 wherein often-changing proportions of fiber volumes are realized throughout the depth of the sealing plate 3. The transition between the individual regions or layers is rather gradual—apart from that, there could be provided, however, a more or less clear break in characteristics between the individual regions. Aside of the variation of local characteristics of the sealing element, there could be proposed a change in fiber reinforcement in the longitudinal direction of its body, particularly in the sealing lamella 3' in FIG. 2 and FIG. 3, and/or in the surrounding synthetic material, for example, to consider the special stress situation in a sealing lamella 3' whereby there could be better considered the highly dynamic bending stress, on one hand, and the stress by impact, on the other hand.

According to FIG. 7 and FIG. 8, essentially flat woven fiber fabrics or fiber webs 17 may be provided as fiber reinforcement 11, which consists of fiber bundles, called ravings, having a great number of individual fibers 15. Apart from that, the flat fiber reinforcement 11 in FIGS. 9–11 is composed of at least one essentially flat non-woven fiber fabric 18 having at least in the plane a random fiber orientation for the most part (see in this matter especially FIG. 9 and FIG. 10). Through the thereby possible symmetric and uniform structure there is prevented the development of residual stress and warping in the sealing elements. Based on the great fiber length of preferably more than 2 mm, for the most part, there is provided a high reinforcement effect through which the required rigidity of the sealing elements may be realized already with a low proportion of fibers (the preferred average proportion in fiber volume in the finished sealing element is in the range of 5 to 30 percent). This results furthermore in favorable damping characteristics of the sealing element in the direction of depth of the body, and a high density as well by reaching a higher density more rapidly in the application. The even or directionally independent (random) distribution of individual fibers 15 within the non-woven fiber fabric 18 prevents delamination of the interfaces and makes very simple impregnation possible, even in case of polymeric molten masses of very high viscosity.

FIG. 11 illustrates in a symbolic manner the manufacturing of a semi-finished plate from which there can be cut out sealing elements for the use in applications according to FIGS. 1–4 by cutting with a water jet (water torch), which guarantees an excellent fabrication quality even with synthetic materials having a relatively highly elastic or tough surface layers. Layers of plastic sheets 12 and non-woven fiber fabrics 18 are alternately placed on top of one another and then compressed in a compression mold 19 under heat by means of a compression molding plug 20. Through the number, thickness, sequence, selection of material, or the like, of the layer, the characteristics of the pre-finished plates can be predetermined and the finished sealing element obtains qualities that can be adjusted to the respective case of application. A structure according to FIG. 5 and FIG. 6 can be achieved, for example, through thicker, fiber-free top layers and through decreased proportion in fiber volume in the center compared to the remaining cross section of the sealing element, whereby the structure ensures, on one hand, an excellent damping quality of the sealing element while having sufficient rigidity, and it ensures, on the other hand, that no near-surface fiber breaks occur with subsequent expansions of cracks caused by the compressive impact stress on the surface. According to FIG. 7, woven fabrics 17 could be used in addition or in place of individual non-woven fabrics 18 to be able to offer locally an increased rigidity, for example, which makes a high reinforcement effect possible in relatively thin layers. Moreover, a separate or additional utilization of individual long-fibered bundles would be possible to take specific local requirements into consideration even better (as illustrated in FIG. 8, for example).

According to FIG. 12, fabrication of essentially strip-shaped semi-finished materials may be performed by continuous compression molding in a double-belt press 21 whereby a plastic sheet 12 and a piece of non-woven fiber fabric 18 or woven fabric 17 is alternately fed from the feed rollers 22 into the double-belt press in which area they are then thermally compression molded.

Figure 13:
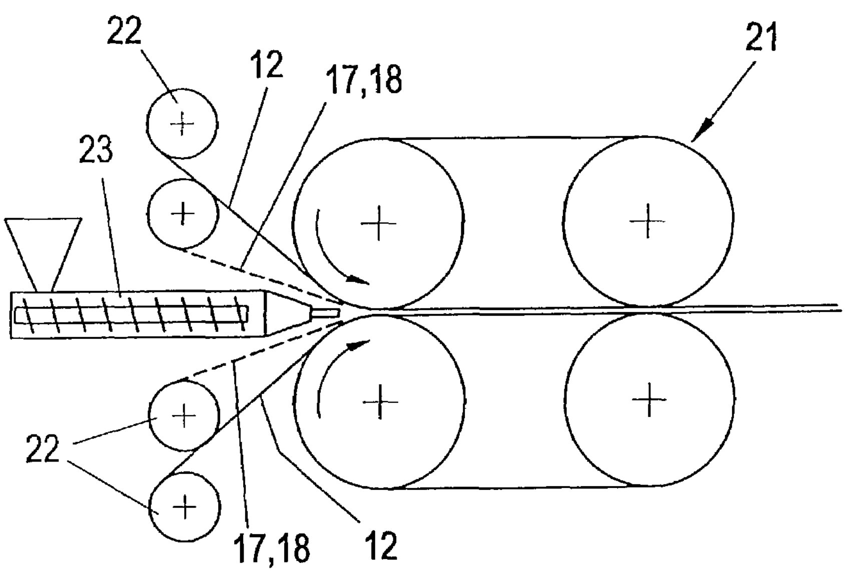

According to FIG. 13 and deviating from FIG. 12, molten mass or powder may be inserted between the pieces of non-woven fiber fabric 18 or woven fabric 17 by means of a feeding device 23 in case of a thermoplastic mold whereby all parts are subsequently compression molded together in the double-belt press 21. This applies in a similar manner to duroplastic resin systems in which resin is applied via a feeding device 23 onto the non-woven fiber fabrics 18 or the woven fabrics 17 and then left there to harden under high temperature and pressure.

We claim:

1. A sealing element for positioning between a seat surface and a stop surface of an automatic compressor valve, said sealing element being composed of synthetic material with embedded fiber reinforcement, said embedded fiber reinforcement consisting of fibers of random orientation, wherein at least one of said fiber reinforcement and said synthetic material in the sealing element has at least one of an inhomogeneous distribution and locally; different material characteristics based on different local requirements and wherein a near-surface region of said sealing element which faces at least one of a seat surface and a stop surface is free of fiber reinforcement un to a depth of at least two times the fiber diameter.

2. A sealing element according to claim 1, wherein said fiber-free region near the surface consists of different material compared to material of the remainder of said sealing element.

3. A sealing element according to claim 2, wherein said different material has at least one of better toughness, higher damping characteristics and higher resistance to cracking caused by fatigue than the material of the remainder of said sealing element.

4. A sealing element according to claim 1, wherein an intermediate layer of the sealing element, which is disposed between the seat surface and the surface of the stop element, is provided with less fiber reinforcement relative to neighboring layers.

5. A sealing element according to claim 4, wherein said intermediate layer has a decreased proportion of fiber volume compared to neighboring regions.

6. A sealing element according to claim 1, wherein said fiber reinforcement is composed of at least one piece of an essentially flat, non-woven fiber fabric, which has, at least in its plane, a directionally independent (random) fiber orientation, in general, and/or at least one essentially flat woven fabric or fiber web.

7. A sealing element according to claim 6, wherein the inhomogeneous distribution of said fiber reinforcement is dependent on at least one of size, shape, material, the spatial arrangement, and distribution of one or more pieces of the flat fiber-fabric composites.

8. A sealing element according to claim 6, wherein individual fibers in said flat fiber-fabric composites have a length of at least 2 mm.

9. A sealing element according to claim 1, wherein the average proportion of fiber volume lies in the sealing element in the range of 5 to 30 percent.

10. A sealing element according to claim 1, wherein said fiber reinforcement is selected from the group consisting of glass fibers, aramide fibers, steel fibers, ceramic fibers, carbon fibers, or a mixture thereof, and said surrounding synthetic material consists of duroplastic or thermoplastic synthetic material selected from the group consisting of epoxy resin, bis-maleimide resin, polyurethane resin, silicone resin, PEEK, PA, PPA, PTFE, PFA, PPS, PBT, PET, PI and PAI.

11. A sealing element according to claim 10, wherein said fiber reinforcement consists of carbon fibers and said surrounding synthetic material is PEEK, PA, PFA or PPS.

* * * * *

UNITED STATES PATENT AND TRADEMARK OFFICE

CERTIFICATE OF CORRECTION

PATENT NO. : 7,011,111 B2
APPLICATION NO. : 10/288468
DATED : March 14, 2006
INVENTOR(S) : Spiegl et al.

It is certified that error appears in the above-identified patent and that said Letters Patent is hereby corrected as shown below:

Col. 8, in claim 1, line 8, delete ";"
line 11, change "un" to --up--

Signed and Sealed this

Twenty-seventh Day of April, 2010

David J. Kappos

*Director of the United States Patent and Trademark Office*